(12) United States Patent
Henn

(10) Patent No.: US 6,907,339 B2
(45) Date of Patent: Jun. 14, 2005

(54) METHOD FOR CONTROLLING AN INTERNAL COMBUSTION ENGINE

(75) Inventor: Michael Henn, Haurich-von Kleist (DE)

(73) Assignee: Siemens Aktiengesellschaft, Munich (DE)

(*) Notice: Subject to any disclaimer, the term of this patent is extended or adjusted under 35 U.S.C. 154(b) by 26 days.

(21) Appl. No.: 10/430,033

(22) Filed: May 5, 2003

(65) Prior Publication Data

US 2004/0049334 A1 Mar. 11, 2004

(30) Foreign Application Priority Data

May 17, 2002 (DE) .......................................... 102 22 137

(51) Int. Cl.$^7$ ................................................ B60T 7/12
(52) U.S. Cl. ...................... 701/104; 701/103; 73/118.1; 73/118.2; 123/90.15; 123/90.16; 123/361; 123/399

(58) Field of Search ................................ 701/103, 104; 73/118.1, 118.2; 123/90.15, 90.16, 361, 399

(56) References Cited

U.S. PATENT DOCUMENTS

| | | | | |
|---|---|---|---|---|
| 5,268,842 A | * | 12/1993 | Marston et al. | ............. 701/105 |
| 6,425,374 B1 | * | 7/2002 | Schmitz et al. | ............. 123/436 |
| 6,654,678 B1 | * | 11/2003 | Rodriguez | .................. 701/104 |

* cited by examiner

Primary Examiner—Tony M. Argenbright
Assistant Examiner—Johnny H. Hoang
(74) Attorney, Agent, or Firm—Richard A. Speer; Mayer, Brown, Rowe & Maw LLP

(57) ABSTRACT

A method for controlling an internal combustion engine having intermittently actuated inlet valves, wherein intake pressure is determined between two final control elements, positions of the control elements are determined, an air quantity flow into the combustion chamber is predicted at preselected times and at preselected positions of the control elements and air is introduced into the engine as a function of the predicted air quantity.

6 Claims, 2 Drawing Sheets

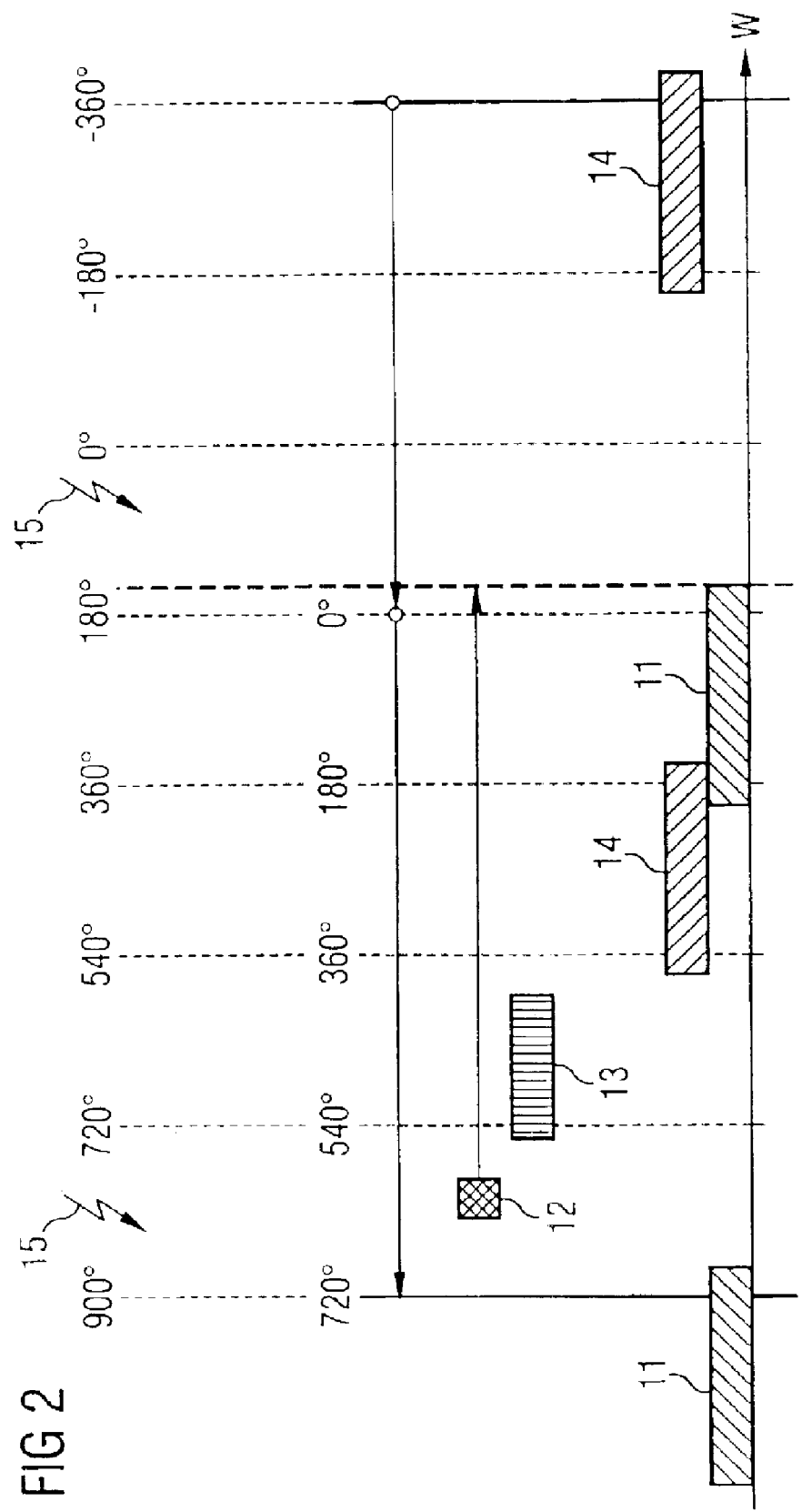

METHOD FOR CONTROLLING AN INTERNAL COMBUSTION ENGINE

BACKGROUND OF THE INVENTION

The invention relates to a method for controlling an internal combustion engine, having intermittently actuated inlet valves, in which in each case fuel is introduced into a combustion chamber and a combustion air mass flow (MF) flowing into the combustion chamber through an intake tract is set, whereby a pressure is determined in the intake tract and two final control elements, which influence the air mass flow in each case, connected in series in the intake tract are used for setting the air mass flow.

In particular in the case of an internal combustion engine having external fuel/air mixing a method is known for controlling the combustion air mass flow and thus the fuel injection in the combustion chambers by way of a final control element provided in the intake tract. Normally this final control element takes the form of a throttle valve which can be used to stop the cross-section of the intake tract. The position of the throttle valve then has a direct effect on the fuel injection. If the throttle valve is not fully open, then the air drawn in by the internal combustion engine is throttled and the torque delivered by the internal combustion engine is thus reduced. This throttle effect depends on the position and thus on the cross-section of opening of the throttle valve. When the throttle valve is fully open, the maximum torque is delivered by the internal combustion engine.

In order to achieve optimum control of the throttle valve, the latter is actuated by an actuator with position feedback. In this situation, a control unit is provided which calculates the required opening for the throttle valve by taking into consideration the current operational state of the internal combustion engine and controls the throttle valve actuator. To this end, an accelerator pedal position is evaluated by way of a pedal sensor.

During operation of the internal combustion engine, particular importance is attached to the determination of the air mass flowing into the combustion chambers of the internal combustion engine. EP 0 820 559 B1 proposes a model-based method in this respect, in which a variable which is characteristic of the fuel injection, namely the air mass flow or induction manifold pressure, is measured and used in a model structure for more precise determination of the fuel injection. As a result, it is possible to exactly implement a desired fuel injection, which has been calculated from a requested torque for example, by means of a corresponding throttle valve setting.

In order to keep the losses occurring at the throttle valve as small as possible, a method is known whereby the inlet valves are capable of being operated with variable valve lift as a second final control element in the intake tract. The inlet valves then open with an adjustable valve lift such that it is possible to dispense with the effect of the throttle valve at least in certain operational phases of the internal combustion engine. The fuel injection for the internal combustion engine is then controlled exclusively by way of the valve lift setting.

In the case of internal combustion engines employing a fuel/air mixture intake, the mixture is formed outside the combustion chamber. For example, an individual injection system is provided in which each combustion chamber of a multi-cylinder internal combustion engine is assigned one injection valve which introduces fuel immediately before the inlet valve. This enables control to be exercised in such a manner that the appropriate fuel mass is allocated to each combustion chamber. By injecting a precisely metered fuel mass immediately before the inlet valve, the mixture formation is improved and an undesired wetting of the walls of the intake tract is avoided.

However, in order to be able to ascertain the appropriate fuel mass, it is necessary to take the combustion air quantity into consideration.

This applies not only to systems where the fuel/air mixture is formed externally but also in the case of internal mixture formation, in other words where fuel is introduced directly into combustion chambers of an internal combustion engine.

BRIEF SUMMARY OF THE INVENTION

The object of the invention is therefore to develop a method of the type mentioned at the beginning such as to achieve optimum control of fuel introduction.

This object is achieved in the case of a method according to the generic type by the fact that the pressure is determined in the intake tract between the two final control elements and the position of the final control elements is measured, that prior to the fuel introduction the air quantity flowing into the combustion chamber of the internal combustion engine after completion of an inlet valve opening operation is predicted from the measured values for pressure and position of the final control elements, and that the quantity of fuel introduced is chosen depending on the predicted air quantity.

The invention therefore predicts the air quantity which is available for the combustion process at a point in time before the fuel is introduced and controls the quantity of fuel introduced depending on the predicted air quantity which will be available for the combustion process. Since the air quantity flow through the intake tract into the combustion chamber is influenced by two final control elements which can be controlled independently of one another, according to the invention the method also provides for determining the pressure in the intake tract between the two final control elements, whereby a measurement can advantageously be performed. Optimally, a suitable model approach can also be used. In addition, the position of the final control elements is evaluated. This is necessary in order to be able to predict the combustion chamber fuel injection.

The method allows a free choice in the use of the final control elements for setting the fuel injection without having to be wary of negative effects on the correct allocation of fuel.

For prediction purposes, the operational parameters of the internal combustion engine are evaluated in a suitable manner, for example the dynamic behavior of the final control elements can be sensed and taken into consideration in an appropriate manner. Advantageously, the method provides for the fact that the temporal change in the pressure and the position of at least one final control element are used for prediction purposes. An enhanced level of accuracy is achieved if the dynamic behavior of the final control elements is likewise taken into account.

In the case of there being two final control elements in the intake tract which influence the air quantity flow, one final control element normally acts on the pressure in the intake tract, which then in turn influences the air quantity flow into the combustion chamber while the other final control element which lies opposite the previously mentioned final control element downstream in the intake tract normally directly influences the air quantity flow into the combustion chamber. A prediction which can be made particularly simply is obtained by using a model for prediction purposes which associates air quantity flow, pressure and position of the two final control elements. In this situation, for example, a static model can be used which yields a prediction in a compute-efficient manner whilst using the chain rule and employing skilful simplification.

In this situation, the computation requirement is reduced particularly if the model has two sub-models, whereby a first sub-model represents the air quantity flow into the combustion chamber as a function of the pressure and the position of the second final control element and a second sub-model represents the pressure as a function of the air quantity flow and the position of the first final control element.

The final control elements normally take the form of a throttle valve and also an inlet valve lift adjustment facility since in order to avoid unnecessary throttle losses operation of the internal combustion engine with as high a level of efficiency as possible can then be achieved.

BRIEF DESCRIPTION OF THE DRAWINGS

The invention will be described in detail in the following with reference to the attached drawings by way of example. In the drawings:

FIG. 2 shows a schematic flowchart of different operations concerning control of the internal combustion engine.

DETAILED DESCRIPTION OF THE INVENTION

Figure 1:
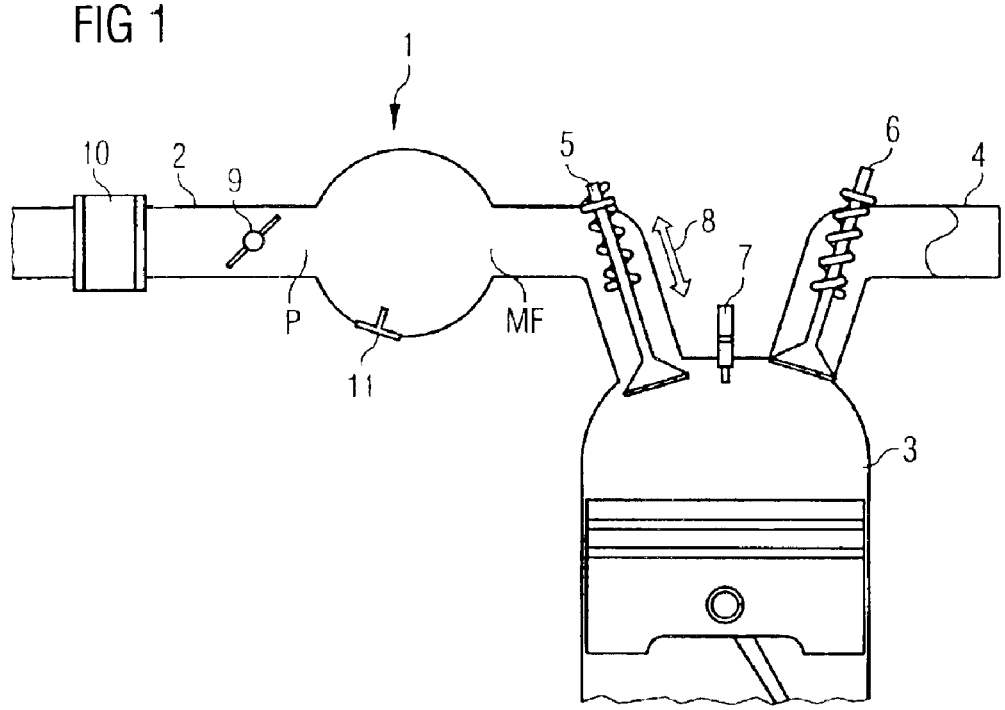
FIG. 1 shows a schematic representation of an intake tract of an internal combustion engine.

The internal combustion engine 1 is illustrated schematically in FIG. 1 with regard to its intake side. It has an intake tract 2, by way of which combustion air enters the combustion chambers of the internal combustion engine 1. A combustion chamber 3 is illustrated schematically in FIG. 1. Exhaust gases from the combustion flow into an exhaust gas tract 4. The combustion chamber 3 is closed off from the intake tract 2 by way of an inlet valve 5 and is closed off from the intake tract 4 by way of an outlet valve 6. In addition, a spark plug 7 projects into the combustion chamber 3, which ignites the fuel/air mixture that has been taken in and compressed.

The lift of the inlet valve 5 can be adjusted by way of a valve lift adjustment unit 8 which is indicated schematically in FIG. 1 by means of a double-ended arrow. In this situation the inlet valve 5, which is actuated by way of a camshaft drive (not shown), executes a maximum lift, differing in size according to the settings of the valve lift adjustment unit 8, which lies between a minimum and a maximum valve lift value. For the sake of simplicity reference is made here simply to "valve lift", by which is meant the maximum raising of the inlet valve 5 during an opening operation. The valve lift is sensed by a valve lift sensor (not shown in FIG. 1).

Also located in the intake tract 2 is a throttle valve 9 which is actuated by means of an actuator with position feedback. In order to implement position feedback a throttle valve sensor (not drawn in FIG. 1) is provided which delivers a measurement value for the opening angle of the throttle valve.

Upstream of the throttle valve 9 in the direction of flow, in the vicinity of the inlet to the intake tract, is located an air mass flow sensor 10 (air mass meter) which detects the air mass flow MF flowing through the intake tract 2. An air mass flow sensor 10 of this type is known for air mass controlled control systems for internal combustion engines.

In addition, between the throttle valve 9 and the inlet valve 5 is situated a pressure sensor 11 which measures the pressure at that point in the intake tract 2. Such a measurement of the induction manifold pressure P is likewise known in the case of induction manifold pressure controlled control concepts.

The internal combustion engine is controlled by a control unit (not shown) which is supplied with measurement values relating to operational parameters of the internal combustion engine 1.

In the internal combustion engine 1 shown in schematic representation, the actual value for the air mass flow MF is sensed by way of the air mass flow sensor 10. The pressure sensor 11 measures the actual value for the induction manifold pressure P and a valve lift sensor senses the actual value for the valve lift.

FIG. 2 shows a flowchart for various operations taking place in the internal combustion engine 1, whereby the plotting occurs against a crankshaft angle W and only the operations for one combustion chamber 3 of a multi-cylinder internal combustion engine 1 are shown. Hatched areas 11 symbolize the inlet valve opening, in other words that period of time or those crankshaft positions in which the inlet valve 5 is open. After the inlet valve 5 has closed, a prediction 12 is made, in which the air mass flowing into the combustion chamber 3 during the next inlet valve opening 11 operation is predicted.

This prediction, which will be described in detail below, is used in order to optimally assess the fuel mass injected during a subsequent injection operation 13 for the combustion chamber 3, such that an appropriate mixture is then present in the combustion chamber 3. In the case of a lean internal combustion engine 1, the torque delivered by the internal combustion engine 1 is set by the fuel mass which is introduced by the injection operation 13. In this situation, the fuel mass added during the injection operation 13 is directly linked to the air mass which is delivered into the combustion chamber 3 during the inlet valve opening operation 11. The same applies in the case of a stoichiometrically operated internal combustion engine 1 in which the air mass and the fuel mass have a stoichiometric relationship.

During injection 13, the injected fuel mass is usually set by way of the duration of the injection operation since the injection pressure is normally constant, in other words it cannot normally be changed. For systems in which the fuel flow can be changed during injection 13, it is however possible to change the fuel mass independently of the duration of injection.

In response to the injection 13, an outlet valve opening operation 14 occurs and exhaust gases are expelled from the combustion chamber 3 into the exhaust gas tract 4. During the inlet valve opening operation 11 which follows subsequently, air/fuel mixture then flows through the inlet valve 5 into the combustion chamber 3, whereby at the conclusion of the inlet valve opening operation 11 an air mass appropriate to the injection 13 which has already taken place on the basis of the prediction 12 flows into the combustion chamber 3.

When the inlet valve 5 is closed, ignition 15 of the mixture takes place and this is followed by a power stroke with subsequent expulsion of the burnt mixture during a renewed outlet valve opening operation 14.

The prediction 12 determines the air mass which has flowed into the combustion chamber 3 after completion of the inlet valve opening operation 11. For this purpose, a model is used which represents the air mass flow MF into the combustion chamber 3 depending on the pressure P in the intake tract and on a valve lift parameter V $$MF = F(P, V) \quad \text{(equation 1)},$$

whereby F symbolizes the functional relationship. The derivation of this model according to time with the aid of the chain rule yields $$\frac{d}{dt} MF = \frac{\partial F}{\partial P} \cdot \dot{P} + \frac{\partial F}{\partial V} \dot{V}, \quad \text{(equation 2)}$$

in which $\partial$ represents the partial derivation.

From a timing point of view the prediction 12 takes place, as can be seen in FIG. 2, over a number of segments H, for example over four segments in the embodiment shown in FIG. 2. By H-fold application of the trapezoid rule, on the basis of the air mass flow of the current segment MF(n) and also the air mass flow of the previous segment MF(n−1), by taking into consideration the derivations the predicted mass flow after H segments can be approximated as follows $$MF(n+H) = \left(MF(n) + 0.5TAH\left(\frac{d}{dt}MF(n-1) + \frac{d}{dt}MF(n)\right)\right), \quad \text{(equation 3)}$$

whereby TA corresponds to the sampling step duration, in other words the duration of one segment.

By using equation 2, this therefore results in $$MF(n+H) = MF(n) + 0.5TAH\frac{\partial F}{\partial P}(\dot{P}(n-1) + \dot{P}(n)) + 0.5TAH\frac{\partial F}{\partial V}(\dot{V}(n-1) + \dot{V}(n)) \quad \text{(equation 4)}$$

Through equation 4, the air mass flow which will appear in the subsequent H segments can be predicted on the basis of the pressure P in the intake tract and also the valve lift parameter V and the temporal derivations from these variables.

If further influencing variables exist, this can likewise be taken into consideration through application of the chain rule by analogy with equation 2.

For the air mass flow MF into the combustion chamber 3, it is possible to apply a volumetric model in which volume efficiency levels dependent on rotational speed and operational parameters are used, in which case for example the following equation applies:

$$MF = (F1 \cdot P - F2)VF \quad \text{(equation 5)},$$

in which VF represents a valve lift function dependent on the valve lift parameter V, in other words it denotes the influence of the valve lift parameter V on the air mass flow flowing into the combustion chamber 3. The factor F1 denotes the gradient of an efficiency level curve and F2 denotes its null value (offset).

With this model, the following is obtained for equation 4

$$MF(n+H) = [F1\{P(n) + 0.5TAH(\dot{P}(n-1) + \dot{P}(n))\} - F2] \cdot \quad \text{(equation 6)}$$
$$VF \cdot \left[1 + 0.5TAH \cdot \frac{1}{VF} \cdot \frac{\partial VF}{\partial V} \cdot (\dot{V}(n-1) + \dot{V}(n))\right],$$

whereby the intersection term of the derivations has been omitted as a higher-order influence to be neglected. The factor $$\frac{1}{VF} \frac{\partial VF}{\partial V}$$

can be determined by means of a suitable characteristic field.

In equation 6, all the parameters for predicting the air mass flow are known. The numeric derivation of the pressure P can be calculated in various ways, as described for example in EP 0 820 055 B1. However, it can also be determined in accordance with the known method of difference formation.

The derivation for the valve lift parameter is calculated by way of a differential equation system, whereby the following first-order time response with the time constant T is used as the basis $$\dot{V} = \frac{1}{T}(sV - V), \quad \text{(equation 7)}$$

where sV is the desired value for the valve lift parameter. A numeric integration, for example in accordance with the known trapezoid rule or Euler's rule, produces the equations $$V(n) = \frac{TA}{2 + \frac{TA}{T}}\left(\dot{V}(n-1) + \frac{sV(n)}{T}\right) \quad \text{(equation 8)}$$

$$\dot{V}(n) = \frac{1}{T}(sV(n) - V(n)) \quad \text{(equation 9)}$$

so that the variables required for evaluating equation 6 are thereby known.

The prediction 12 is then performed by means of equation 6, whereby the number of segments H is selected such that the prediction specifies the air mass flow at the point in time at which the inlet valve opening operation 11 is completed.

What is claimed is:

1. Method for controlling an internal combustion engine, having intermittently actuated inlet valves, in which in each case fuel is introduced into a combustion chamber and a combustion air mass flow (MF) flowing into the combustion chamber through an intake tract is set, whereby a pressure (P) is determined in the intake tract and first and second variable final control elements, which influence the air mass flow (MF) in each case, are connected in series in the intake tract and are used for setting the air mass flow (MF), comprising the steps of:
    a) determining the pressure in the intake tract between the first and second final control elements and determining the positions of the final control elements,
    b) predicting the air quantity (MF) flowing into the combustion chamber of the internal combustion engine after completion of the inlet valve opening operation and prior to fuel introduction into the air from the values for air pressure and position of the first and second final control elements, and
    c) introducing into the air a quantity of fuel chosen as a function of the predicted air quantity (MF).

2. Method according to claim 1, characterized in that the temporal change in the pressure (P) and the position of the second final control element are used for prediction purposes.

3. Method according to claim 1, characterized in that for prediction purposes a model is used which associates air quantity flow (MF), pressure (P) and positions of the first and second final control elements.

4. Method according to claim 2, characterized in that for prediction purposes a model is used which associates air quantity flow (MF), pressure (P) and position of the first and second final control elements.

5. Method according to claim 3, characterized in that the model has two sub-models, whereby a first sub-model represents the air quantity flow (MF) into the combustion chamber as a function of the pressure (P) and the position of the second final control element and a second sub-model represents the pressure (P) as a function of the air quantity flow (MF) and the position of the first final control element.

6. Method according to claim 1, characterized in that a throttle valve is used as a first final control element and that an inlet valve lift adjustment facility is used as a second final control element.

* * * * *